(12) United States Patent
Kang et al.

(10) Patent No.: US 8,907,942 B2
(45) Date of Patent: Dec. 9, 2014

(54) SERVER FOR PROVIDING THREE-DIMENSIONAL CONTENTS AND METHOD THEREOF, AND TERMINAL FOR THREE-DIMENSIONAL DISPLAY

(75) Inventors: Moon-Soon Kang, Seongnam-shi (KR); Jang-Hyuk Park, Goyang-shi (KR)

(73) Assignee: KT Corporation, Gyeonggi-do (KR)

( * ) Notice: Subject to any disclaimer, the term of this patent is extended or adjusted under 35 U.S.C. 154(b) by 873 days.

(21) Appl. No.: 12/665,922

(22) PCT Filed: Jun. 18, 2008

(86) PCT No.: PCT/KR2008/003463
§ 371 (c)(1),
(2), (4) Date: Dec. 21, 2009

(87) PCT Pub. No.: WO2008/156306
PCT Pub. Date: Dec. 24, 2008

(65) Prior Publication Data
US 2010/0321379 A1    Dec. 23, 2010

(30) Foreign Application Priority Data
Jun. 19, 2007    (KR) .......................... 10-2007-0059835

(51) Int. Cl.
| | |
|---|---|
| G06T 15/00 | (2011.01) |
| G09G 5/00 | (2006.01) |
| H04L 29/06 | (2006.01) |
| H04N 7/173 | (2011.01) |
| H04N 13/00 | (2006.01) |

(52) U.S. Cl.
CPC ........ *H04L 65/4084* (2013.01); *H04N 7/17318* (2013.01); *H04N 13/0059* (2013.01); *H04L 69/24* (2013.01)
USPC .......................................... 345/419; 345/619

(58) Field of Classification Search
CPC combination set(s) only.
See application file for complete search history.

(56) References Cited

U.S. PATENT DOCUMENTS

| 7,412,091 B2* | 8/2008 | Hack ............................. 382/154 |
| 2004/0078814 A1 | 4/2004 | Allen |
| 2004/0239679 A1* | 12/2004 | Ito et al. ........................ 345/555 |
| 2005/0086612 A1 | 4/2005 | Gettman et al. |

(Continued)

FOREIGN PATENT DOCUMENTS

| KR | 10-2005-0040532 A | 5/2005 |
| KR | 10-2005-0082209 A | 8/2005 |
| KR | 10-2006-0070002 A | 6/2006 |

OTHER PUBLICATIONS

International Search Report dated Jan. 7, 2009 of Parent Application PCT/KR2008/003463, 3 pages.

(Continued)

*Primary Examiner* — Kee M Tung
*Assistant Examiner* — Leon T Cain, II
(74) *Attorney, Agent, or Firm* — IP Legal Services, LLC (57) ABSTRACT

The present invention relates to a 3D contents providing service. A 3D contents providing server includes a 3D contents providing request receiver for receiving a 3D contents providing request through a communication network, a subscriber manager for checking a communication terminal to which the 3D contents will be provided when the 3D contents providing request is received, a 3D contents selecting extractor for receiving 3D contents selecting information to be provided to the checked communication terminal and extracting the selected 3D contents, and a 3D contents provider for providing the extracted 3D contents to the communication terminal, and the 3D contents include side information provided to the communication terminal and output by the communication terminal.

17 Claims, 8 Drawing Sheets

(56) References Cited

U.S. PATENT DOCUMENTS

2005/0215239 A1\* 9/2005 Kopra et al. ............... 455/414.1
2008/0140868 A1\* 6/2008 Kalayjian et al. ................. 710/8

OTHER PUBLICATIONS

Written Opinion dated Jan. 7, 2009 of Parent Application PCT/KR2008/003463, 5 pages.

\* cited by examiner

SERVER FOR PROVIDING THREE-DIMENSIONAL CONTENTS AND METHOD THEREOF, AND TERMINAL FOR THREE-DIMENSIONAL DISPLAY

TECHNICAL FIELD

The present invention relates to a 3-dimensional (3D) contents providing service. More particularly, the present invention relates to a 3D contents providing server and method for providing 3D contents to a communication terminal available for 3D display, and a 3D display communication terminal.

BACKGROUND ART

A current mobile phone has a main display for outputting information on the front surface. Also, the mobile phone may have two displays to be used for different purposes.

A user of the mobile phone may differently configure a background screen output to the mobile phone screen in order to distinguish the mobile phone of the user from that of another user, or may change the external case to identify the user from another user.

Users' demands for a service that enables expression of the individual character of the mobile phone user have increased.

The mobile phone uses one or two displays to use additional services as well as the mobile communication service.

However, the mobile phone has a limit of showing all mobile communication services through one or two displays because the display size is small.

The above information disclosed in this Background section is only for enhancement of understanding of the background of the invention and therefore it may contain information that does not form the prior art that is already known in this country to a person of ordinary skill in the art.

DETAILED DESCRIPTION

Technical Problem

The present invention has been made in an effort to provide a 3D contents providing server and method for showing the character of a communication terminal user by using a communication terminal for outputting 3D contents, and a 3D display communication terminal.

Also, the present invention has been made in another effort to provide a 3D contents providing server and method for generating various new businesses by providing respective 3D contents to a communication terminal for outputting 3D contents and providing convenience to the user, and a 3D display communication terminal.

Technical Solution

An exemplary embodiment of the present invention provides a 3D contents providing server for providing a 3D contents providing service including: a 3D contents providing request receiver for receiving a 3D contents providing request through a communication network; a subscriber manager for checking a communication terminal for receiving the 3D contents when the 3D contents providing request is received; a 3D contents selecting extractor for receiving 3D contents selecting information to be provided to the checked communication terminal, and extracting corresponding 3D contents; and a 3D contents provider for providing the extracted 3D contents to the communication terminal, wherein the 3D contents includes side information to be provided to the communication terminal and to be output by the communication terminal.

Another embodiment of the present invention provides a method for a 3D contents providing server to provide 3D contents including: receiving a 3D contents providing request through a communication network; checking a communication terminal to which the 3D contents will be provided; receiving 3D contents selecting information to be provided to the checked communication terminal, and extracting corresponding 3D contents; providing the extracted 3D contents to the communication terminal, wherein the 3D contents include side information that is provided to the communication terminal and is then output by the communication terminal.

Yet another embodiment of the present invention provides a communication terminal for generating 3D contents including: a 3D contents receiver for receiving 3D contents from a 3D contents providing server; and a 3D contents display manager for analyzing side information included in the received 3D contents, and respectively outputting the received 3D contents on the side corresponding to the side information.

According to an embodiment of the present invention, a method for a communication terminal to provide 3D contents includes: receiving 3D contents from a 3D contents providing server; and analyzing side information included in the received 3D contents, and respectively outputting the received 3D contents to the side that corresponds to the side information.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

The communication terminal 100 will be assumed to have six sides, and the present invention is applicable to various formats of communication terminal 100 such as a circular terminal, or a terminal with eight sides.

Figure 1:
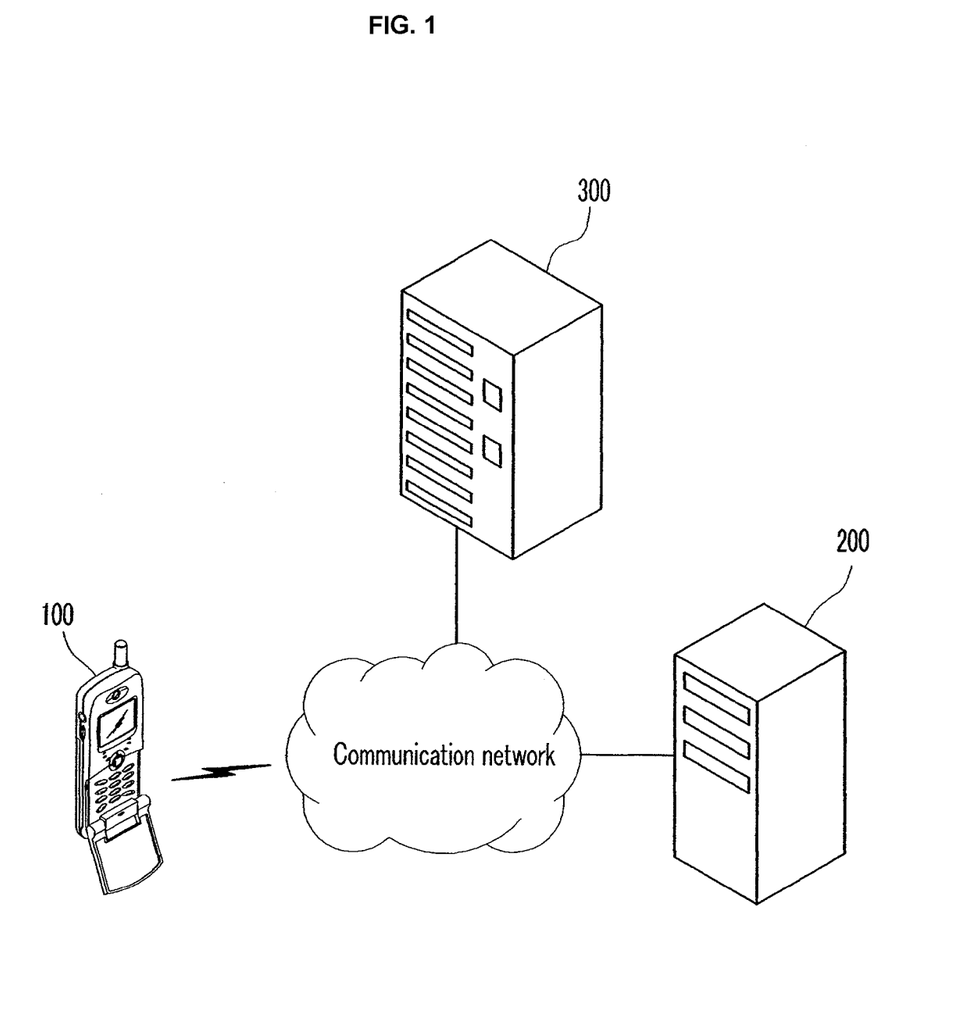
FIG. 1 shows a schematic network diagram for a 3D contents providing service according to an exemplary embodiment of the present invention.

FIG. 1 shows a schematic diagram of a 3D contents providing service system for a 3D contents providing service according to an exemplary embodiment of the present invention.

Referring to FIG. 1, the 3D contents providing service system includes a communication terminal 100, a 3D contents providing server 200, and a 3D contents request server 300.

The communication terminal 100 may be a communication terminal 100 having a display or a speaker on each side, such as a mobile phone or a personal digital assistant (PDA). Also, the communication terminal 100 may be a DMB terminal for receiving broadcasting information.

3D contents are transmitted to the DMB receiving terminal through a broadcasting channel to thus provide a 3D contents providing service.

The communication terminal 100 requests a 3D contents service from the 3D contents providing server 200 through the communication network.

The communication terminal 100 receives downloaded 3D contents from the 3D contents providing server 200 through the wireless network such as CDMA, W-CDMA, wireless LAN, portable Internet, and DMB, and outputs the 3D contents to the display or the speaker installed on each side.

The 3D contents providing server 200 receives a 3D contents request from the communication terminal 100 through the Internet or the mobile communication network, and provides 3D contents to a corresponding communication terminal 100.

Also, the 3D contents providing server 200 receives a 3D contents providing request toward a predetermined communication terminal 100 from the 3D contents request server 300, and provides the 3D contents to the communication terminal 100. The 3D contents providing server 200 provides image information or video information displayed on each side of the communication terminal 100, or provides sound information broadcast by the speaker.

The 3D contents are multimedia data output to the display on each side of the communication terminal 100.

For example, the 3D contents include images, videos, sound, and fragrance information.

The 3D contents include type information of the 3D contents to be output to each side of the communication terminal 100 and side information to which the 3D contents will be output.

For example, part of a data field of the 3D contents stores 3-bit type information (e.g., 001 image, 010 video, 011 sound, and 100 fragrance) and 3-bit side information (000 front side, 001 rear side, 010 left side, 011 right side, 100 top side, and 101 rear side).

The 3D contents can configure a united single piece of multimedia data generated by having combined multimedia data on the respective sides (e.g., a 3D image generated by combining data on six sides), and the corresponding contents can be reconfigured to be a format easily understandable by the user.

For example, when the 3D contents are provided from a mobile shopping server to the communication terminal 100, 3D product information can be output by a united image on the six sides.

The 3D contents can be configured in a format for outputting different information to each display without being united into multimedia data on the respective sides.

The 3D contents request server 300 requests the 3D contents providing server 200 to provide 3D contents to a specific communication terminal 100.

For example, the 3D contents request server 300 can be a shopping server for providing 3D product information to the communication terminal 100.

The 3D contents request server 300 requests the 3D contents providing server 200 to provide the 3D contents to the communication terminal 100 according to a request by the communication terminal 100 or forcibly.

The 3D contents request server 300 transmits in advance the 3D contents to be provided to the communication terminal 100 so that the 3D contents may be stored in the 3D contents providing server 200.

Figure 2:
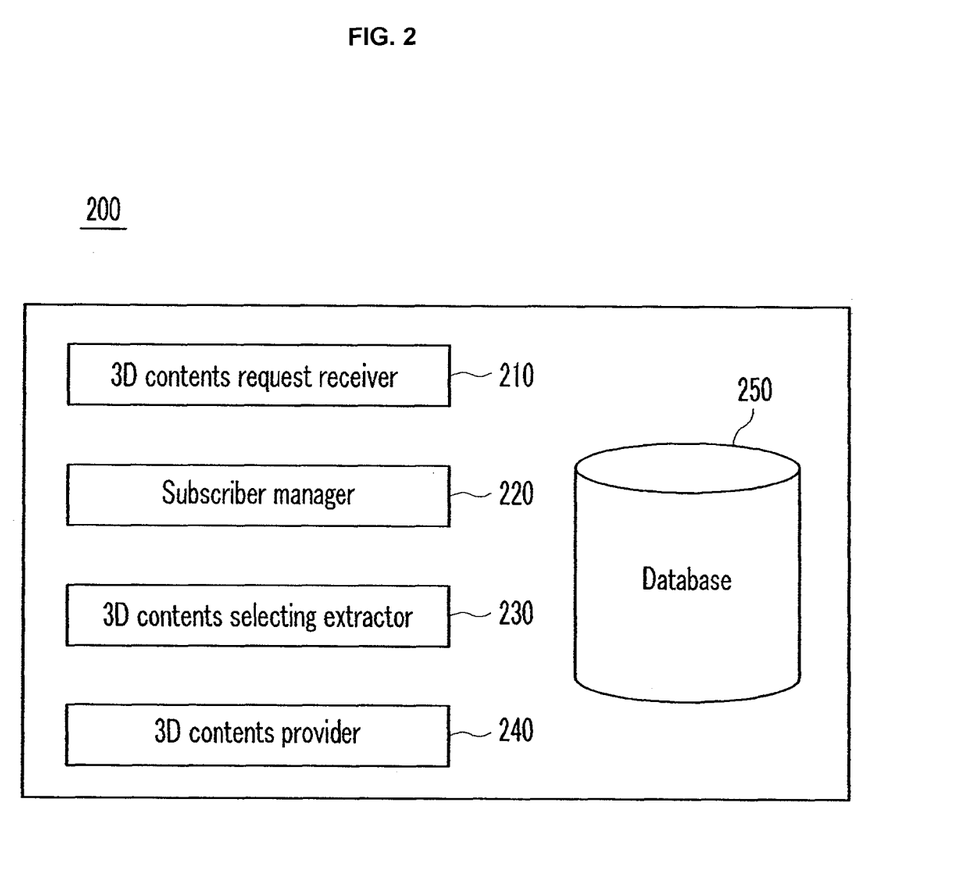
FIG. 2 shows a block diagram of a 3D contents providing server according to an exemplary embodiment of the present invention.

FIG. 2 shows a block diagram of a 3D contents providing server according to an exemplary embodiment of the present invention.

Referring to FIG. 2, the 3D contents providing server 200 includes a 3D contents request receiver 210, a subscriber manager 220, a 3D contents selecting extractor 230, a 3D contents provider 240, and a database 250.

The 3D contents request receiver 210 receives a 3D contents providing service request from the communication terminal 100 or the 3D contents request server 300 through the wired/wireless communication network.

The 3D contents request receiver 210 receives a subscription request on a 3D contents providing service from the communication terminal 100 or the 3D contents request server 300, and receives subscriber information. Here, subscriber information includes subscriber profile information for billing, financial information, and information on the communication terminal 100 for providing a service.

The subscriber manager 220 authenticates a subscriber when receiving a 3D contents providing service request from the communication terminal 100 or the 3D contents request server 300.

The subscriber manager 220 determines whether the communication terminal 100 to which the 3D contents will be transmitted is a 3D display available communication terminal 100 when the 3D contents service request is provided by the subscriber according to the subscriber authentication result. Here, the state of the 3D display available communication terminal 100 is determined by using the information of the communication terminal 100 that is received by inquiring of a subscriber database of the mobile communication service provider by using subscriber information on the communication terminal 100 that is input when the subscription is requested or a telephone number of the communication terminal 100 to which the 3D contents will be provided.

The 3D contents selecting extractor 230 extracts corresponding 3D contents selected from the communication terminal 100 or the 3D contents request server 300.

The 3D contents selecting extractor 230 can provide a 3D contents selecting menu to the communication terminal 100 so as to select 3D contents.

Also, the 3D contents selecting extractor 230 receives a selecting signal for the corresponding 3D contents from the 3D contents request server 300, and transmits it to the target communication terminal 100.

Here, the selecting signal can be information for identifying the 3D contents generated by the 3D contents request server 300 and stored in the 3D contents providing server 200.

The 3D contents provider 240 provides the extracted 3D contents to the corresponding communication terminal 100.

The database 250 stores subscriber information and 3D contents of the 3D contents providing service. Here, the 3D contents can be multimedia data available for 3D display on the respective sides in the communication terminal 100 available for display on the respective sides. The 3D contents include multimedia data type information and information on the side to be output.

Figure 8:
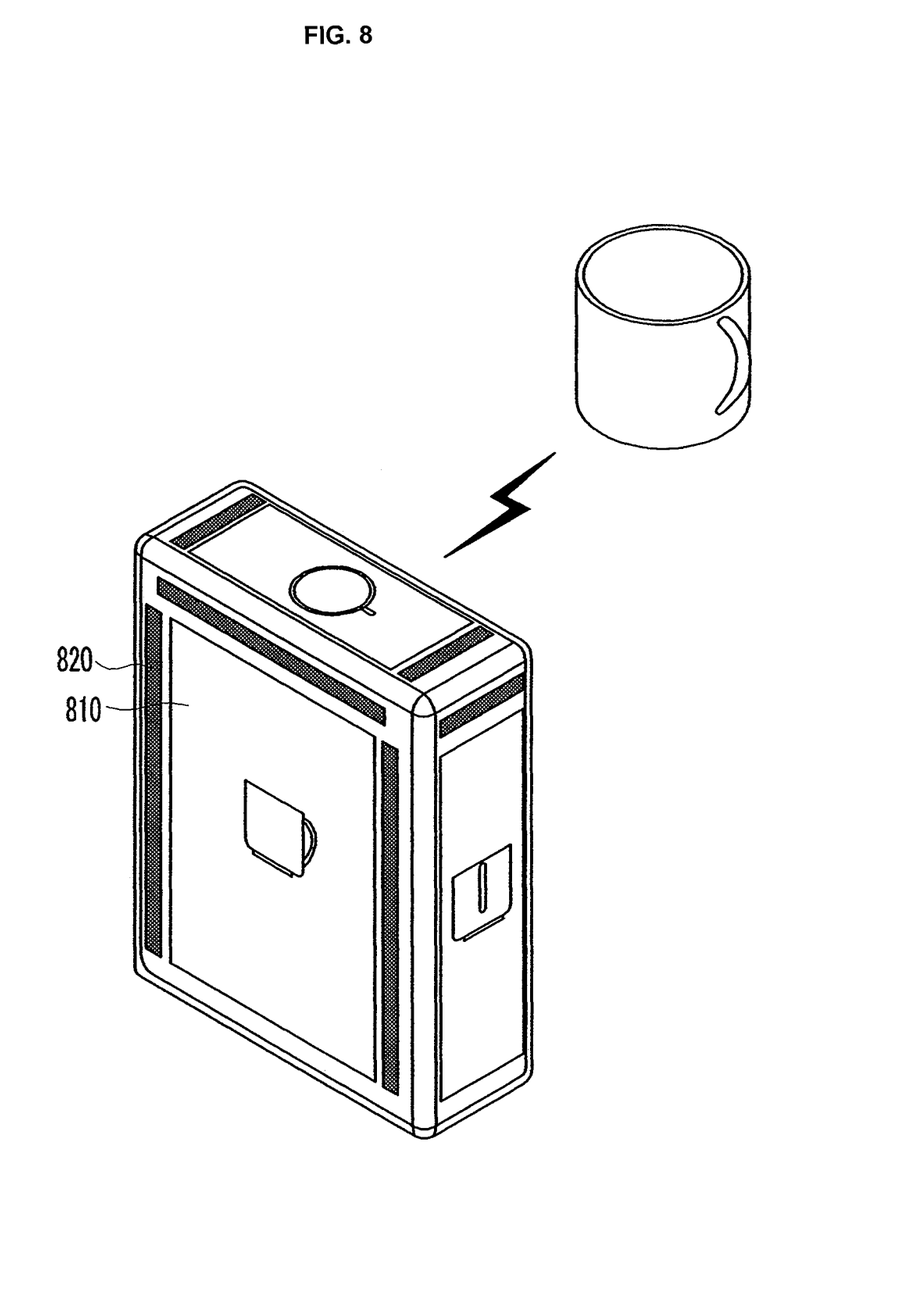
FIG. 8 shows a 3D display communication terminal according to an exemplary embodiment of the present invention.

For example, as shown in FIG. 8, the 3D contents can be provided as a single united image generated by combining six image information so that the displays on the six sides of the communication terminal 100 may output the front, rear, left, and right images of a cup in the case of outputting an image of the cup.

For example, movements of back/forth/left/right/up/down by one image of the 3D contents are respectively output to the six side displays of the communication terminal 100 to provide an image that is generated by uniting six image information.

Figure 3:
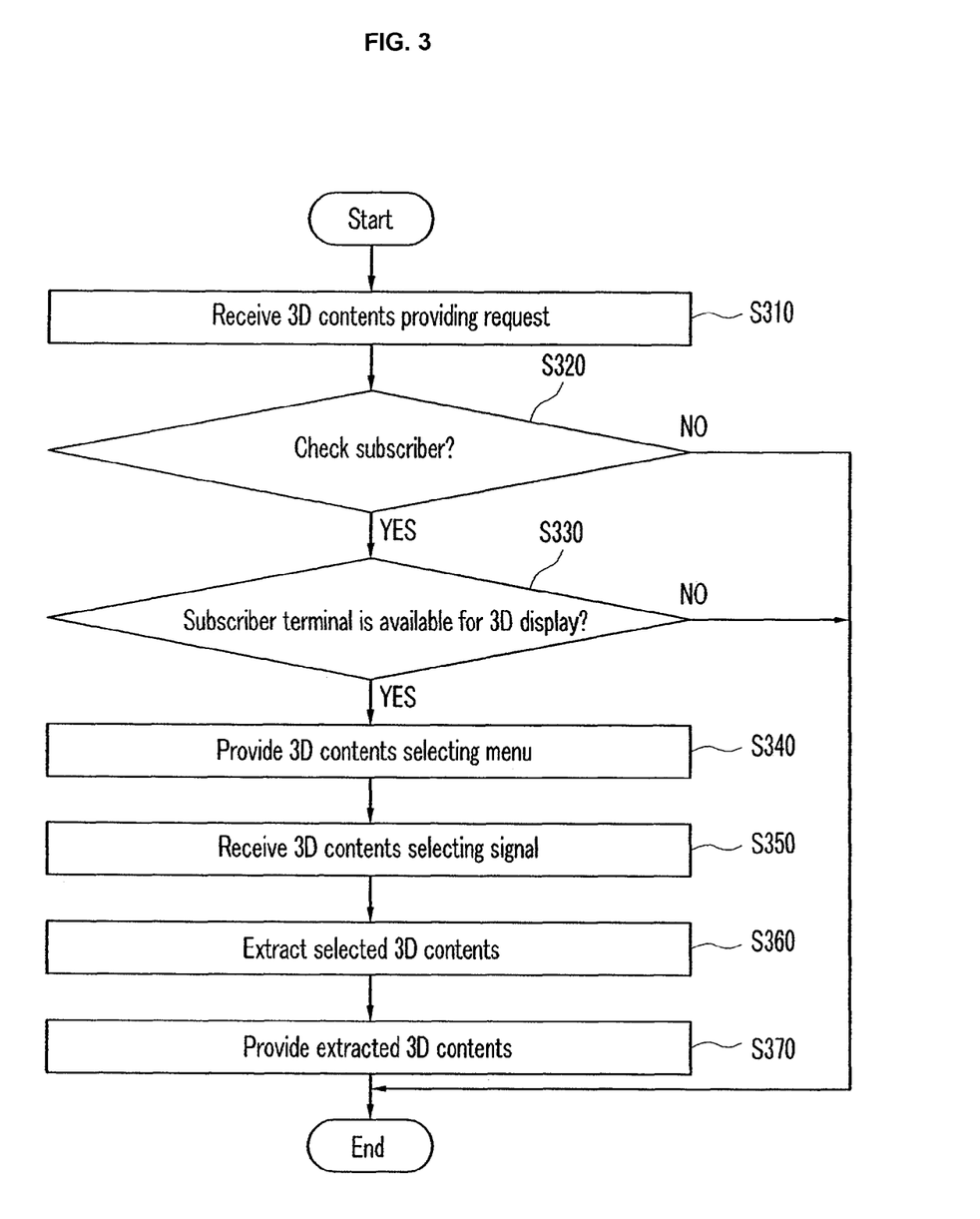
FIG. 3 shows a flowchart of a 3D contents providing method according to an exemplary embodiment of the present invention.

FIG. 3 shows a flowchart of a 3D contents providing method according to an exemplary embodiment of the present invention.

The 3D contents providing method according to the embodiment of the present invention includes a method for providing 3D contents to the communication terminal 100 from the terminal of a desktop computer through the Internet, and a method for receiving 3D contents from the communication terminal 100 through the mobile communication network.

The 3D contents providing method for the terminal 100 such as a desktop computer to request 3D contents from the 3D contents providing server 200 through the Internet and transmitting the selected 3D contents to the communication terminal 100 will now be mainly described, and the method for the terminal 100 to directly receive the 3D contents through the mobile communication network.

Referring to FIG. 3, the 3D contents providing server 200 receives a 3D contents providing request signal from a terminal such as a desktop computer (S310).

The 3D contents providing server 200 authenticates a subscriber of the terminal having requested 3D contents provision (S320). Here, the subscriber authentication method includes a generally known method (e.g., a method for checking an ID and a password). However, subscriber authentication is applied to the fixed monthly pay service in the communication service, and since the number of the terminal having requested 3D contents is generally billed when a 3D contents provision is requested, the subscriber authentication process of S320 can be processed as an option.

When the user of the terminal is found to be a subscriber according to the subscriber authentication result, the 3D contents providing server 200 determines whether the communication terminal 100 to which the 3D contents will be provided is a terminal available for outputting 3D contents by using the 3D contents (S330).

Here, subscriber information or information on the communication terminal 100 (type information of the communication terminal 100, version information, or information on functions to be provided by the terminal) stored in the client database of the mobile communication service provider can be used when determining whether it is a communication terminal 100 available for outputting 3D contents.

Figure 7:
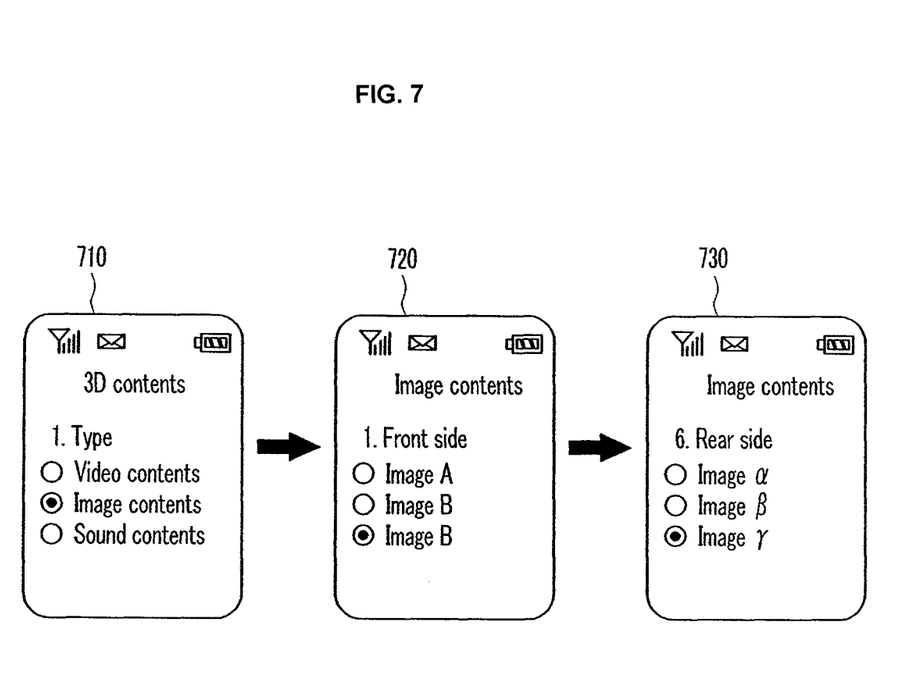
FIG. 7 shows a 3D contents providing method according to an exemplary embodiment of the present invention.

The 3D contents providing server 200 provides a menu for selecting 3D contents to the communication terminal 100 (S340). The menu for selecting the 3D contents is configured to select multimedia information to be output to the respective sides of the communication terminal 100 as shown in FIG. 7.

For example, the menu for selecting contents can be configured with a menu for selecting a type of 3D contents and side information on which the selected 3D contents will be output. Also, a 3D contents set configured by a single theme can be selected.

The 3D contents providing server 200 receives a 3D contents selecting signal from the communication terminal 100 (S350).

The 3D contents providing server 200 extracts the selected 3D contents from the database 250 (S360).

The 3D contents providing server 200 provides the extracted 3D contents to the communication terminal 100 (S370).

The communication terminal 100 receives 3D contents from the 3D contents providing server 200, analyzes them, checks multimedia data type information and side information to be output, and respectively the corresponding 3D contents to the corresponding sides.

Also, the communication terminal 100 can transmit the 3D contents to another communication terminal by using a wireless LAN or a cable.

Figure 4:
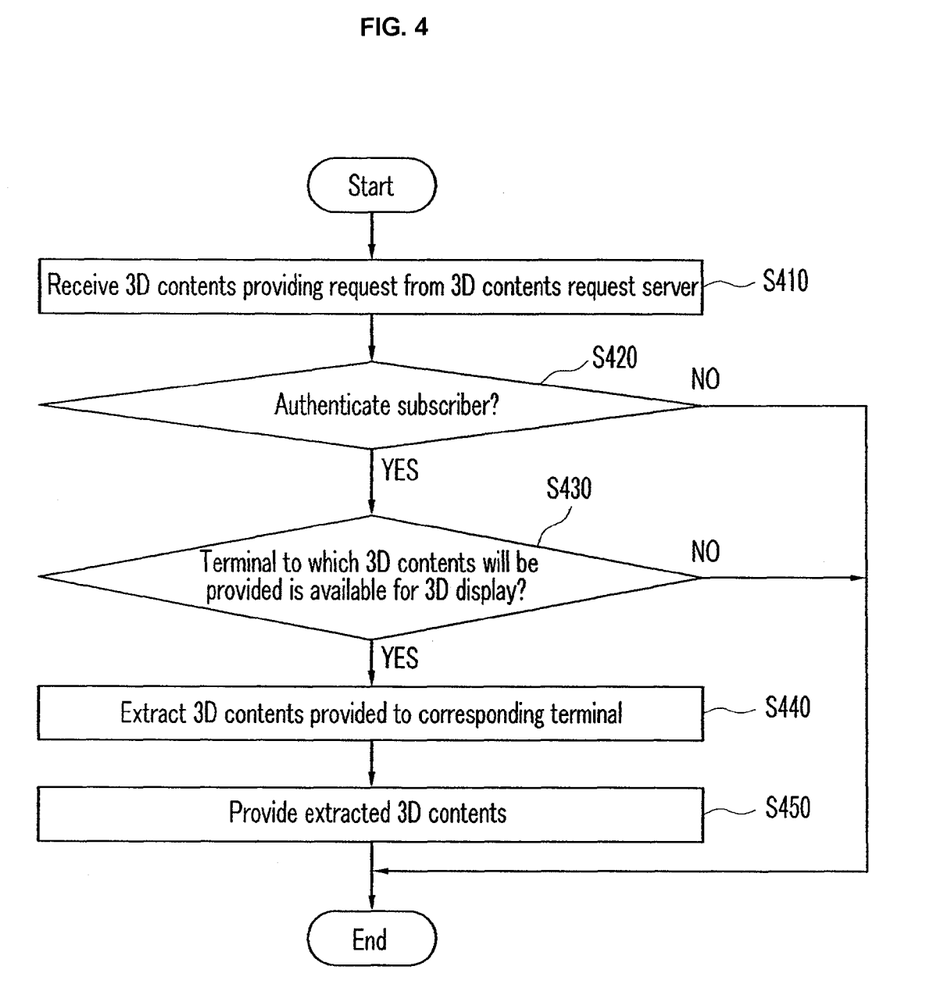
FIG. 4 shows a flowchart of a 3D contents providing method according to another exemplary embodiment of the present invention.

FIG. 4 shows a flowchart of a 3D contents providing method according to another exemplary embodiment of the present invention.

A 3D contents providing method for the 3D contents request server 300 to request 3D contents from the 3D contents providing server 200 through the wired communication network and to transmit the same to the communication terminal 100 will now be described.

The 3D contents providing server 200 receives a 3D contents providing request signal from the 3D contents request server 300 (S410).

The 3D contents providing server 200 authenticates a subscriber of the 3D contents request server 300 having requested 3D contents provision (S420).

When the user of the 3D contents request server 300 is a subscriber according to the subscriber authentication result, the 3D contents providing server 200 determines whether the communication terminal 100 is a communication terminal 100 available for outputting 3D contents (S430).

Here, information on the communication terminal 100 (communication terminal type or version information) stored in the client database of the mobile communication service provider can be used to determine whether it is a communication terminal 100 available for outputting 3D contents.

The 3D contents providing server 200 extracts the 3D contents selected by the 3D contents request server 300 from the database 250 (S440). Here, the 3D contents includes information on the side on which the 3D contents will be displayed and multimedia data type information (e.g., the contents type is an image, video, sound, or fragrance).

The 3D contents providing server 200 provides the extracted 3D contents to the communication terminal 100 (S450).

The communication terminal 100 receives the 3D contents from the 3D contents providing server 200, analyzes such, checks multimedia type information and side information to be output, and outputs the 3D contents to the corresponding sides.

Figure 5:
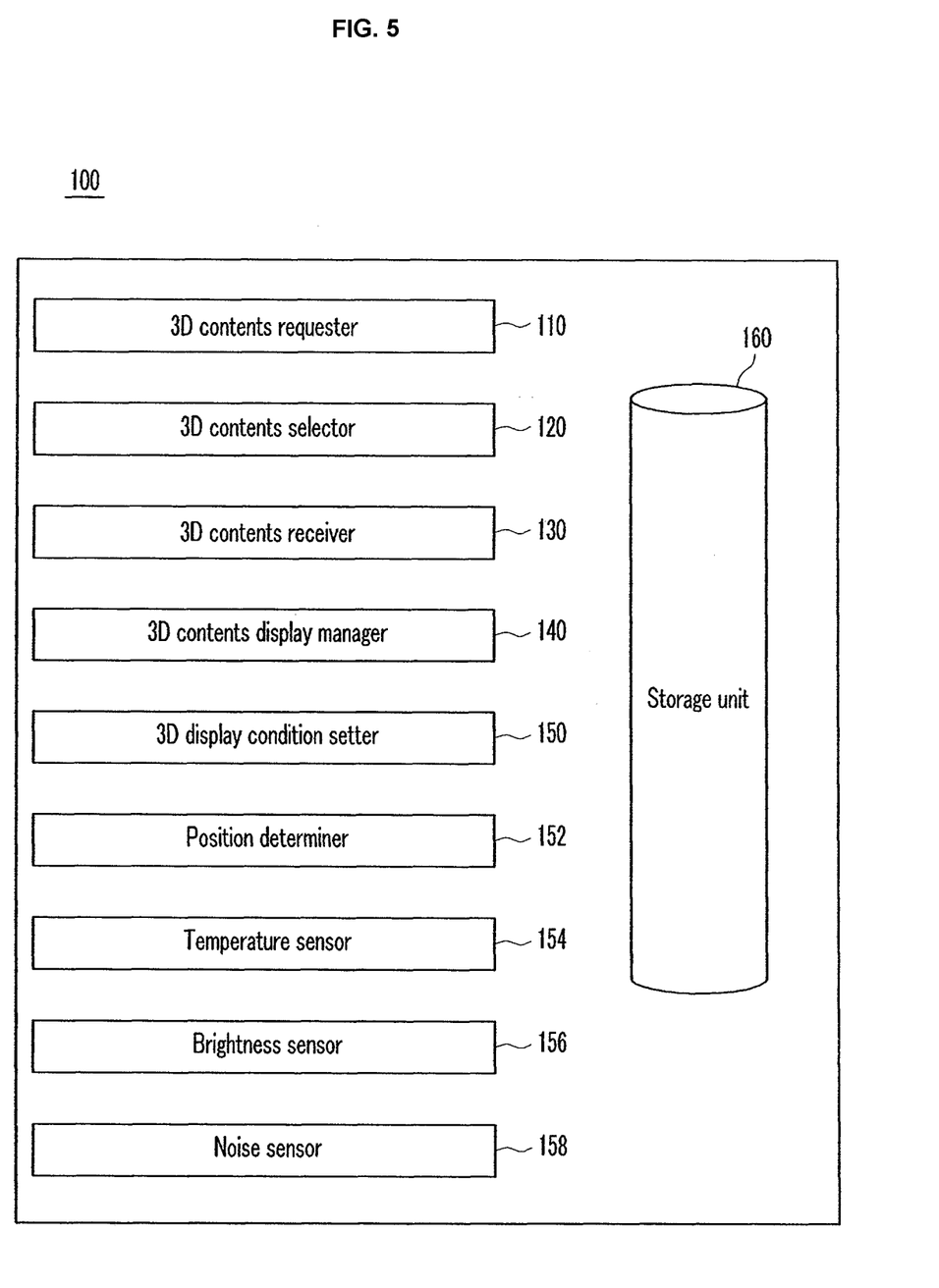
FIG. 5 shows a block diagram of a 3D display communication terminal according to an exemplary embodiment of the present invention.

FIG. 5 shows a block diagram of a communication terminal 100 for outputting 3D contents according to an exemplary embodiment of the present invention.

Referring to FIG. 5, the communication terminal 100 includes a 3D contents requester 110, a 3D contents selector 120, a 3D contents receiver 130, a 3D contents display manager 140, and a storage unit 150.

The 3D contents requester 110 requests a 3D contents providing service from the 3D contents providing server 200 through the communication network.

The 3D contents selector 120 transmits a desired 3D contents selecting signal to the 3D contents providing server 200.

When the 3D contents providing server 200 authenticates the subscriber, the 3D contents selector 120 selects the 3D contents to be downloaded through the menu for selecting 3D contents from the 3D contents providing server 200. Here, the menu for selecting the 3D contents can be output to a specific side of the communication terminal 100 through a user interface, and it can be configured to select a 3D contents multimedia data type, corresponding 3D contents, and the side to which the corresponding 3D contents will be applied.

The 3D contents receiver 130 receives the 3D contents from the 3D contents providing server 200.

The 3D contents receiver 130 can directly receive the 3D contents from the 3D contents providing server 200 through the mobile communication network. In addition, the 3D contents receiver 130 can receive the 3D contents from another communication terminal having downloaded the 3D contents by using a wireless local communication such as Bluetooth, or a cable.

The 3D contents receiver 130 receives display information (3D contents) of another communication terminal through wireless local communication when the other communication terminal is positioned near the 3D contents receiver 130. That is, when the communication terminal 100 approaches the other communication terminal, the 3D contents receiver 130 receives display information of the other communication terminal and configures it as display information of the communication terminal 100.

The 3D contents display manager 140 analyzes the received 3D contents to check the multimedia type information of the 3D contents and side information to be output, and generates an output that corresponds to the multimedia type of the corresponding side.

For example, when the multimedia type is sound, the 3D contents display manager 140 outputs corresponding 3D contents to the speaker installed on the side to be output, and when the multimedia type is an image, it displays a corresponding image to the side to be output. Also, when the multimedia type is fragrance, the 3D contents display manager 140 outputs corresponding 3D contents to an installed fragrance generator. Here, the fragrance generator is a device for controlling natural fragrance or artificial fragrance to be generated or spread according to electrical signals by using generation material.

The 3D contents display manager 140 controls the speaker or the display on respective sides of the communication terminal 100.

Also, the 3D contents display manager 140 sets the positions of the sides according to the shape of the communication terminal 100. For example, when the shape of the communication terminal 100 is cuboid, oval, circular, folder, or flip type, the 3D contents display manager 140 controls the display by setting the sides according to the shape.

The 3D display condition setter 150 presets the conditions that are output to the sides by using the 3D contents stored in the communication terminal 100.

For example, the 3D display condition setter 150 can change the images that are output to the sides of the communication terminal 100 at regular time intervals.

That is, the 3D display condition setter 150 sets different 3D contents that are output to the respective sides of the communication terminal 100 according to the time, position, or condition (brightness, volume of noise, temperature, contact, and fragrance) of the communication terminal 100 so that the sides of the communication terminal 100 may be differently displayed.

For example, the 3D display condition setter 150 can set the 3D contents display condition by using time information so that the 3D contents may be differently output by division of morning and afternoon.

Also, the communication terminal 100 can include a position determiner 152, a temperature sensor 154, a brightness sensor 156, a noise sensor 158, a time measurer (not shown), a contact sensor (not shown), and a fragrance sensor (not shown), respectively for sensing time, position, temperature, brightness, volume of size, contact, and fragrance from among the conditions.

The communication terminal 100 can set the 3D display condition by using position information so that the 3D contents may be differently output according to the position (e.g., a district area) measured by the GPS receiver and the position determiner 152 including map information.

For example, the communication terminal 100 can display the movement of position according to the position by differentiating the outputs of the sides of the communication terminal 100.

Also, it is possible to display the 3D contents in cooperation with a GPS receiver and a camera depending on the condition so that the communication terminal 100 may display the shape of a shingle in a sand beach in summer.

In addition, it has been described that the corresponding sides of one thing are displayed on the entire sides (front/rear/left/right/top/bottom) of the communication terminal 100, and it is possible to provide various formats of 3D information by respectively controlling the 3D contents to be displayed on the respective side of the communication terminal 100 by the 3D display condition setter 150.

For example, the 3D display condition setter 150 can control 3D display information selected by the user (e.g., 3D display information downloaded from the server having various 3D contents) to be displayed on the respective sides of the communication terminal 100 according to the users so that even the same communication terminal 100 may be a communication device for an exclusive use for each person according to the users having the corresponding communication terminal 100.

Also, the 3D display condition setter 150 can control one side of the communication terminal 100 to be used as a display region for displaying the 3D contents, and the other side to be used as a display region for displaying desired information.

Further, the 3D display condition setter 150 can control one side of the communication terminal 100 to be used as a display region for displaying the 3D contents, and the other side to be used as an input region for receiving information from the user. The input region is touchable to input data in a like manner of the touch pad.

Also, when the service region of the mobile communication is extended from a person to a general device, the 3D display condition setter 150 can determine the contents displayed to the sides of the communication terminal 100 as the function of personalized accessories.

For example, when an oval communication terminal 100 is positioned on the table as an ornament, the ornament displays various types of screens according to the time and conditions (temperature, brightness, volume of size, and personal condition information), and performs the function corresponding to the user's touch inputs. Here, an additional device for determining the temperature, brightness, and personal condition information is to be installed in the communication terminal 100. For example, the communication terminal 100 can be displayed as a clock, as an ornament in another situation, and perform a music player function and display the corresponding screen in a further situation.

Also, the combined images displayed on the respective sides of the communication terminal 100 basically show a single image of a thing, and the 3D display condition setter 150 can set the condition of dividing and displaying at least two images of things to the respective sides of the communication terminal 100. For example, a dog image is displayed on the front side of the communication terminal 100 and a cat image is displayed on the rear side of the communication terminal 100 so that the things displayed on sides of the communication terminal 100 are the dog and the cat, and as a result, the images displayed to the communication terminal 100 can be a transformed image, that is an image having the front appearance of the dog and the rear appearance of the cat.

When the temperature measured by the temperature sensor 154 is exemplified, the communication terminal 100 can set the 3D contents display condition by using temperature information so that the 3D contents may be changed when the temperature is greater than 30 degrees centigrade. Here, a humidity sensor (not shown) for measuring temperature and humidity can be further included, and in this instance, the humidity together with the temperature is used to set the 3D contents display condition.

The communication terminal 100 can set the 3D contents display condition by using brightness information so as to change the 3D contents when the brightness is less than that measured by the brightness sensor 156, for example, 150 cd/m2.

The communication terminal 100 can set the 3D contents display condition by using the volume of noise so as to change the 3D contents when the noise measured by the noise sensor 158 is greater than 70 dB.

The 3D contents displayed to the communication terminal 100 are either 3D contents preset by the communication terminal 100 or 3D contents downloaded in real-time from the server depending on the conditions such as the position, temperature, brightness, and volume of noise.

The communication terminal 100 can set the 3D contents display condition so as to output the contents that correspond to specific fragrance with reference to fragrance information measured by the fragrance sensor (not shown).

The storage unit 160 stores menu information for selecting 3D contents, received 3D contents, and 3D contents display condition information.

Figure 6:
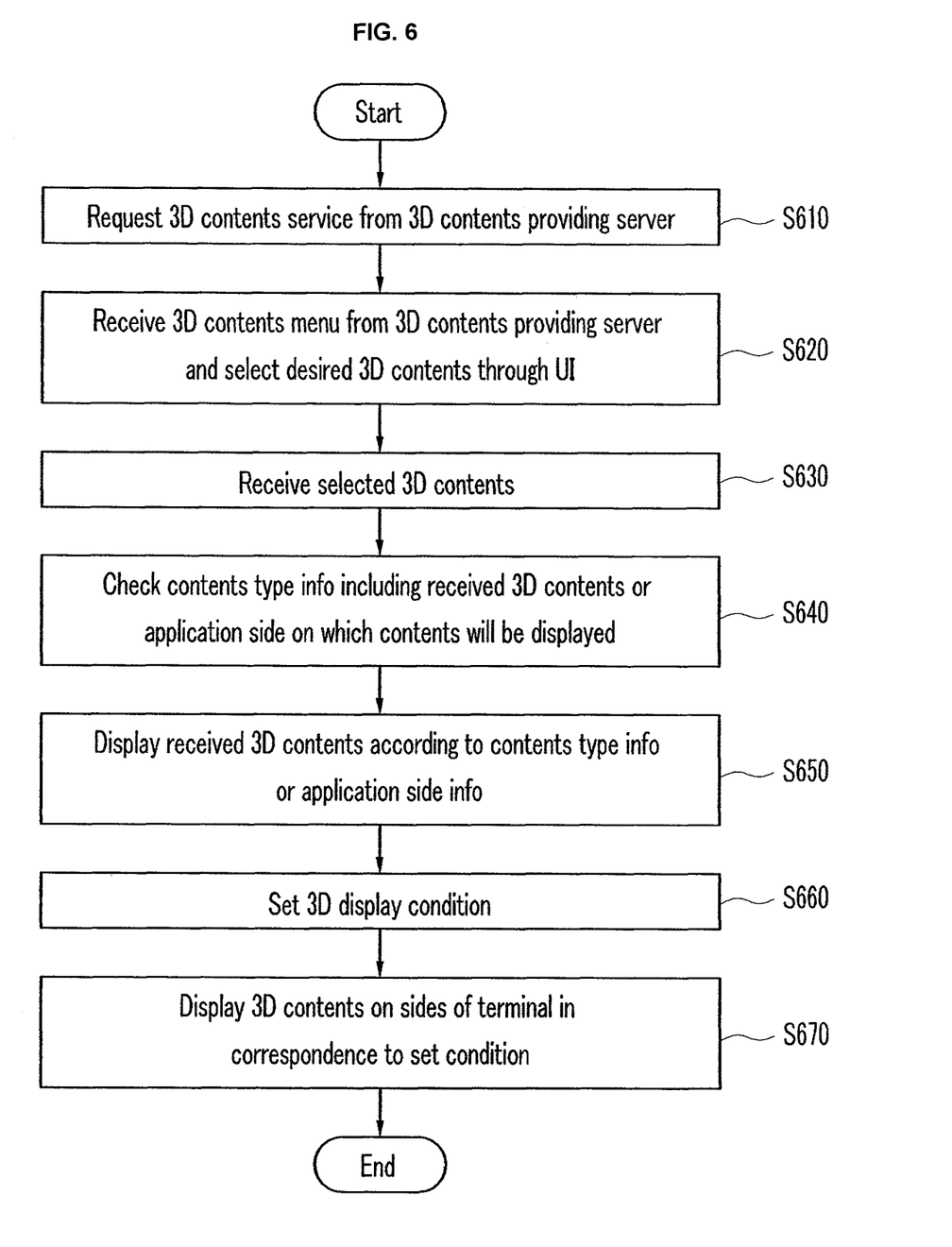
FIG. 6 shows a flowchart of a 3D contents providing method by a 3D display communication terminal according to an exemplary embodiment of the present invention.

FIG. 6 shows a flowchart of a 3D contents providing method by a 3D display communication terminal 100 according to an exemplary embodiment of the present invention.

The communication terminal 100 requests a 3D contents providing service from the 3D contents providing server 200 through the communication network (S610).

The communication terminal 100 receives the menu for selecting 3D contents, and selects 3D contents to be downloaded (S620).

Here, the menu for selecting 3D contents can be output to a specific side of the communication terminal 100 through a user interface, and it can be configured to select the multimedia type of the 3D contents, the corresponding 3D contents, and the side to which the corresponding 3D contents will be applied.

The communication terminal 100 receives the selected 3D contents from the 3D contents providing server 200 (S630).

The communication terminal 100 analyzes the received 3D contents (S640).

The communication terminal 100 checks the multimedia type information of the 3D contents and side information to be output according to the analysis result, and generates the outputs that correspond to the multimedia type on the corresponding side (S650).

The communication terminal 100 outputs the corresponding 3D contents through the display or the speaker and sets the 3D display condition (S660).

The communication terminal 100 can output the 3D contents to the sides of the communication terminal 100 in correspondence to the set condition (S670).

The communication terminal 100 can differently configure the respective sides of the communication terminal 100 by differently setting the 3D contents that are output to the sides of the communication terminal 100 according to the conditions such as time, position, or situation (brightness, volume of noise, temperature, and fragrance). The communication terminal 100 can output the corresponding 3D contents to the installed fragrance generator when the multimedia type of the 3D contents is fragrance.

The present invention can express the character of the communication terminal user by using a communication terminal available for outputting 3D contents of respective sides.

Also, the present invention generates various new businesses and provides convenience to the user since it provides 3D contents to the communication terminal available for outputting 3D contents.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A three-dimensional ("3D") content data providing server for providing a 3D content data providing service, the server configured to:
   receive a 3D content data providing request from a requesting communication terminal through a communication network;
   determine, using subscriber information on the requesting communication terminal stored in a mobile communication service provider when the 3D content data providing request is received, whether the requesting communication terminal is able to perform a 3D content data output;
   provide a 3D content data selection menu to the requesting communication terminal when the requesting communication terminal is able to perform the 3D content data output, wherein the 3D content data selection menu includes at least one submenu for selecting multimedia data to be output per side of the requesting communication terminal;
   receive 3D content data selecting information determined through the 3D content data selection menu, from the requesting communication terminal;
   extract a 3D content data corresponding to the 3D content data selecting information; and
   provide the extracted 3D content data to the requesting communication terminal,
   wherein the 3D content data includes (i) a plurality of multimedia data to be output through each multimedia data output unit included in a respective side of the requesting communication terminal, and (ii) side information indicating on which of the respective sides of the requesting communication terminal each of the plurality of multimedia data will be output.

2. The server of claim 1, wherein a type of the plurality of multimedia data includes at least one of image, video, sound, and fragrance, wherein the 3D content data further includes type information of the plurality of multimedia data.

3. The server of claim 1, wherein the plurality of multimedia data include one of (i) a plurality of sub-data forming a single multimedia data concept, and (ii) a plurality of individual image data corresponding to respective sides of an object.

4. A communication terminal for outputting three-dimensional ("3D") content data, the communication terminal configured to:
   transmit a 3D content data providing request to a 3D content data providing server;
   receive a 3D content data selection menu from the 3D content data providing server, wherein the 3D content data selection menu includes at least one submenu for selecting multimedia data to be output per side of the communication terminal;
   transmit 3D content data selecting information determined through the 3D content data selection menu, to the 3D content data providing server;
   receive 3D content data corresponding to the 3D content data selecting information, from the 3D content data providing server, the 3D content data including (i) a plurality of multimedia data to be output through each multimedia data output unit included in a respective side of the requesting communication terminal, and (ii) side information indicating on which of the respective sides of the requesting communication terminal each of the plurality of multimedia data will be output,
   wherein the 3D content data providing server uses subscriber information on the communication terminal stored in a mobile communication service provider, when the 3D content data providing request is received, to determine whether the requesting communication terminal is able to output the 3D content data; and
   analyze the side information included in the received 3D content data, and respectively output the plurality of multimedia data of the received 3D content data through the each multimedia data output unit included in the respective sides corresponding to the side information.

5. The communication terminal of claim 4, wherein the each multimedia data output unit comprises at least one of a display, a speaker, and a fragrance generator installed on the respective sides of the communication terminal.

6. The communication terminal of claim 4, further configured to:
   receive a condition for the output 3D content data,
   wherein the 3D content data is output according to the input condition.

7. The communication terminal of claim 6, wherein at least two images are separately displayed on the respective sides of the communication terminal and the images displayed on the respective sides of the communication terminal are combined to provide a changed image.

8. The communication terminal of claim 6, wherein the input condition is time information, and the 3D content data is output according to the input time information.

9. The communication terminal of claim 6, further comprising:
   a position determiner,
   wherein the condition is position information, and the output 3D content data is preset or real-time downloaded according to the position information.

10. The communication terminal of claim 6, further comprising:
    a temperature sensor,
    wherein the condition is temperature information, and the output 3D content data is preset or real-time downloaded according to the temperature information.

11. The communication terminal of claim 6, further comprising:
    a brightness sensor,
    wherein the condition is brightness information, and the output 3D content data is preset or real-time downloaded according to the brightness information.

12. The communication terminal of claim 6, further comprising:
    a noise sensor,
    wherein the condition is information on the volume of noise, and the output 3D content data is preset or real-time downloaded according to the information on the volume of noise.

13. The communication terminal of claim 6, wherein the 3D content data is displayed on one side of the communication terminal and information set by a user is displayed on another side of the communication terminal.

14. The communication terminal of claim 6, wherein the 3D content data is displayed on one side of the communication terminal and another side is an input region for receiving information from the user of the communication terminal.

15. The communication terminal of claim 4, wherein the plurality of multimedia data include one of (i) a plurality of sub-data forming a single multimedia data concept, and (ii) a plurality of individual image data corresponding to respective sides of an object.

16. A method for a communication terminal to provide three-dimensional ("3D") content data, the method comprising:
    transmitting a 3D content data providing request to a 3D content data providing server;
    receiving a 3D content data selection menu from the 3D content data providing server, wherein the 3D content data selection menu includes at least one submenu for selecting multimedia data to be output per side of the communication terminal;
    transmitting 3D content data selecting information determined through the 3D content data selection menu, to the 3D content data providing server;
    receiving 3D content data corresponding to the 3D content data selecting information from the 3D content data providing server, the 3D content data including (i) a plurality of multimedia data to be output through each multimedia data output unit included in a respective side of the requesting communication terminal, and (ii) side information indicating on which of the respective sides of the requesting communication terminal each of the plurality of multimedia data will be output,
    wherein the 3D content data providing server uses subscriber information on the communication terminal stored in a mobile communication service provider, when the 3D content data providing request is received, to determine whether the requesting communication terminal is able to output the 3D content data; and
    analyzing the side information included in the received 3D content data, and respectively outputting the plurality of multimedia data of the received 3D content data through the each multimedia data output unit included in the respective sides that correspond to the side information.

17. The method of claim 16, further comprising:
after outputting the 3D content data,
receiving an output condition of the 3D content data; and
outputting the input contents according to the input condition;
wherein the input condition includes at least one of time information, position information, temperature information, brightness information, information on the volume of noise, and contact information.

\* \* \* \* \*